United States Patent
Umachandran et al.

(10) Patent No.: US 12,418,242 B2
(45) Date of Patent: Sep. 16, 2025

(54) LOW-INDUCTANCE DUAL-FULL BRIDGE POWER SUPPLY MODULE WITH INTEGRATED SENSING

(71) Applicant: Canoo Technologies Inc., Torrance, CA (US)

(72) Inventors: Prashanth M. Umachandran, Long Beach, CA (US); Yunqi Zheng, Rancho Palos Verdes, CA (US); Ashish Ekbote, Cerritos, CA (US); Ajay K. Morya, San Jose, CA (US)

(73) Assignee: CANOO TECHNOLOGIES INC., Torrence, CA (US)

(*) Notice: Subject to any disclaimer, the term of this patent is extended or adjusted under 35 U.S.C. 154(b) by 367 days.

(21) Appl. No.: 18/056,096

(22) Filed: Nov. 16, 2022

(65) Prior Publication Data
US 2023/0179103 A1 Jun. 8, 2023

Related U.S. Application Data

(60) Provisional application No. 63/287,427, filed on Dec. 8, 2021.

(51) Int. Cl.
*H02M 3/00* (2006.01)
*B60L 50/60* (2019.01)
(Continued)

(52) U.S. Cl.
CPC ......... *H02M 3/33573* (2021.05); *B60L 50/60* (2019.02); *H02J 7/0013* (2013.01);
(Continued)

(58) Field of Classification Search
CPC .............................. H02M 3/003; H02M 7/003
See application file for complete search history.

(56) References Cited

U.S. PATENT DOCUMENTS 5,835,356 A * 11/1998 Wieloch ................. H05K 7/209
174/254
7,227,259 B2 6/2007 Heilbronner et al.
(Continued)

FOREIGN PATENT DOCUMENTS

DE 102008049193 B4 9/2014

OTHER PUBLICATIONS

Yun et al., "A DAB Converter with Common-Point-Connected Winding Transformers Suitable for a Single-Phase 5-Level SST System," MDPI, Energies, 2018, 16 pages.
(Continued)

Primary Examiner — Gary A Nash
(74) Attorney, Agent, or Firm — ALLEN, DYER, DOPPELT, + GILCHRIST, P.A. Attorneys at Law

(57) ABSTRACT

An apparatus includes an insulated metal substrate (IMS) board having a base metal layer and a conductive layer separated by a dielectric layer. The apparatus also includes a full bridge of a dual-full bridge power converter configured to convert between higher and lower electrical voltages. The full bridge is carried by the IMS board and is electrically coupled to the conductive layer. The full bridge includes multiple electrical switches configured to selectively form and break electrical connections with a transformer of the dual-full bridge power converter. The apparatus further includes at least one output capacitor carried by the IMS board. The at least one output capacitor is coupled to the full bridge and is configured to store electrical energy. The base metal layer is configured as a grounding plane for the full bridge, and the full bridge has split ground connections to the grounding plane.

20 Claims, 15 Drawing Sheets

(51) Int. Cl.
  *H02J 7/00* (2006.01)
  *H02M 1/00* (2006.01)
  *H02M 1/08* (2006.01)
  *H02M 3/335* (2006.01)
  *H02M 7/00* (2006.01)

(52) U.S. Cl.
  CPC ......... *H02J 7/0063* (2013.01); *H02M 1/0009* (2021.05); *H02M 1/08* (2013.01); *H02M 3/003* (2021.05); *H02J 2207/20* (2020.01); *H02M 7/003* (2013.01)

(56) References Cited

U.S. PATENT DOCUMENTS

| | | | |
|---|---|---|---|
| 7,248,483 B2 * | 7/2007 | West | H02M 7/003 361/801 |
| 7,295,448 B2 * | 11/2007 | Zhu | H02M 3/33576 363/17 |
| 7,301,755 B2 * | 11/2007 | Rodriguez | H05K 7/14322 174/16.3 |
| 8,279,620 B2 * | 10/2012 | Herron | H02M 7/003 361/784 |
| 8,466,541 B2 | 6/2013 | Jones et al. | |
| 8,637,964 B2 | 1/2014 | Jones et al. | |
| 9,257,825 B2 | 2/2016 | Kalayjian et al. | |
| 9,536,671 B2 | 1/2017 | Ramm et al. | |
| 10,193,442 B2 * | 1/2019 | Parto | H02M 3/003 |
| 2005/0024805 A1 | 2/2005 | Heilbronner et al. | |
| 2006/0039127 A1 | 2/2006 | West | |
| 2006/0290689 A1 | 12/2006 | Grant et al. | |
| 2018/0235071 A1 | 8/2018 | Barrass et al. | |
| 2019/0191585 A1 * | 6/2019 | McPherson | H01L 25/072 |
| 2021/0316637 A1 | 10/2021 | Slepchenkov et al. | |

OTHER PUBLICATIONS

International Search Report and Written Opinion of the International Searching Authority dated Feb. 28, 2023 in connection with International Patent Application No. PCT/US2022/50142, 11 pages.

* cited by examiner

LOW-INDUCTANCE DUAL-FULL BRIDGE POWER SUPPLY MODULE WITH INTEGRATED SENSING

CROSS-REFERENCE TO RELATED APPLICATION AND PRIORITY CLAIM

This application claims priority under 35 U.S.C. § 119 (e) to U.S. Provisional Application No. 63/287,427 filed on Dec. 8, 2021. This provisional application is hereby incorporated by reference in its entirety.

TECHNICAL FIELD

This disclosure relates generally to power supply systems. More specifically, this disclosure relates to a low-inductance dual-full bridge power supply module with integrated sensing.

BACKGROUND

An electric vehicle includes a power supply that provides electrical power to one or more electric motors and other components of the electric vehicle. Often times, the power supply includes a power converter that converts a higher voltage from a battery pack or other power source into a lower voltage for use by other components of the electric vehicle. For example, the power converter may convert an input voltage of one or several hundred volts into an output voltage of one or several tens of volts.

SUMMARY

This disclosure provides a low-inductance dual-full bridge power supply module with integrated sensing.

In a first embodiment, an apparatus includes an insulated metal substrate (IMS) board having a base metal layer and a conductive layer separated by a dielectric layer. The apparatus also includes a full bridge of a dual-full bridge power converter configured to convert between a higher electrical voltage and a lower electrical voltage. The full bridge is carried by the IMS board and is electrically coupled to the conductive layer. The full bridge includes multiple electrical switches configured to selectively form and break electrical connections with a transformer of the dual-full bridge power converter. The apparatus further includes at least one output capacitor carried by the IMS board. The at least one output capacitor is coupled to the full bridge and is configured to store electrical energy. The base metal layer is configured as a grounding plane for the full bridge, and the full bridge has split ground connections to the grounding plane.

In a second embodiment, a system includes an IMS board having a base metal layer and a conductive layer separated by a dielectric layer. The IMS board carries a first full bridge of a dual-full bridge power converter configured to convert between a higher electrical voltage and a lower electrical voltage. The first full bridge is electrically coupled to the conductive layer. The first full bridge includes multiple electrical switches configured to selectively form and break electrical connections with a transformer of the dual-full bridge power converter. The IMS board also carries at least one output capacitor coupled to the full bridge and configured to store electrical energy. The system also includes a main board carrying a second full bridge of the dual-full bridge power converter. The transformer couples the first and second full bridges. The base metal layer is configured as a grounding plane for the first full bridge, and the first full bridge has split ground connections to the grounding plane.

In a third embodiment, an electric vehicle includes one or more batteries configured to provide a higher direct current (DC) electrical voltage, a DC bus configured to provide a lower DC electrical voltage, and a power supply module. The power supply module includes an IMS board having a base metal layer and a conductive layer separated by a dielectric layer. The IMS board carries a first full bridge of a dual-full bridge power converter configured to convert between the higher DC electrical voltage and the lower DC electrical voltage. The first full bridge is electrically coupled to the conductive layer. The first full bridge includes multiple electrical switches configured to selectively form and break electrical connections with a transformer of the dual-full bridge power converter. The IMS board also carries at least one output capacitor coupled to the full bridge and configured to store electrical energy. The power supply module also includes a main board carrying a second full bridge of the dual-full bridge power converter. The transformer couples the first and second full bridges. The base metal layer is configured as a grounding plane for the first full bridge, and the first full bridge has split ground connections to the grounding plane.

In a fourth embodiment, a method includes controlling a first full bridge carried by an IMS board and a second full bridge carried by a main board of a dual-full bridge power converter to convert between a higher electrical voltage and a lower electrical voltage, The IMS board includes a base metal layer and a conductive layer separated by a dielectric layer. The first full bridge is electrically coupled to the conductive layer. The first full bridge includes multiple electrical switches configured to selectively form and break electrical connections with a transformer of the dual-full bridge power converter. At least one output capacitor is carried by the IMS board, and the at least one output capacitor is coupled to the full bridge and is configured to store electrical energy. The base metal layer is configured as a grounding plane for the first full bridge, and the first full bridge has split ground connections to the grounding plane.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
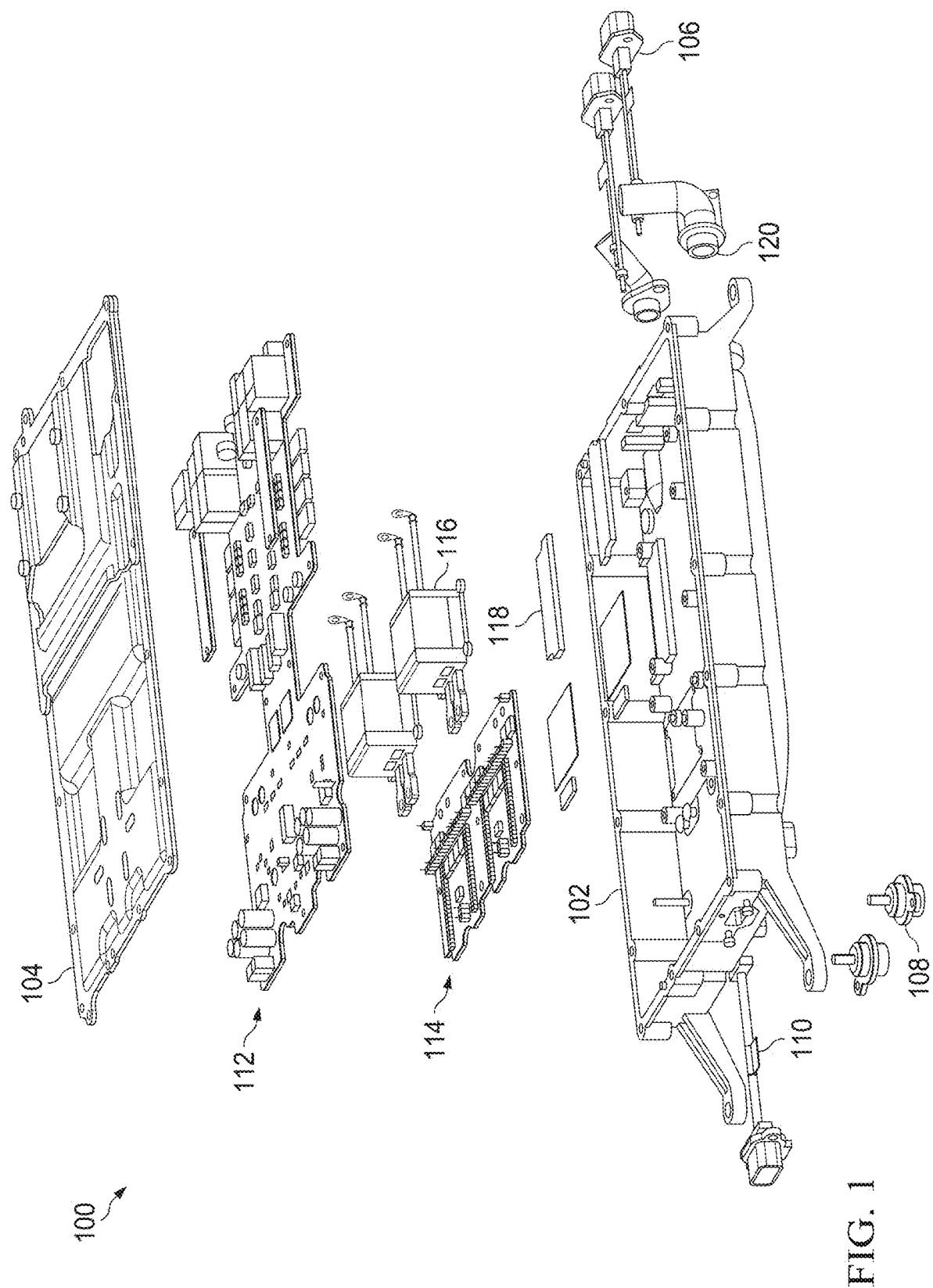
FIG. 1 illustrates an example low-inductance dual-full bridge power supply module according to this disclosure.

FIGS. 1 through 9, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, an electric vehicle includes a power supply that provides electrical power to one or more electric motors and other components of the electric vehicle. Often times, the power supply includes a power converter that converts a higher voltage from a battery pack or other power source into a lower voltage for use by other components of the electric vehicle. For example, the power converter may convert an input voltage of one or several hundred volts into an output voltage of one or several tens of volts.

In some cases, at least part of a power converter may be implemented using an insulated metal substrate (IMS) board, which may include a metal carrier (such as aluminum or copper) and conductive traces (such as copper) separated by an electrically-insulative dielectric material (such as polymer or ceramic). This type of construction allows the IMS board to dissipate large amounts of heat generated by electrical components and other components coupled to the conductive traces and carried by the IMS board. Unfortunately, there can be various challenges with component placement and routing when using a single-layer IMS design. Among other things, these challenges may include connector overheating due to very high ripple currents when ripple-handling capacitors are placed on different boards, high output voltage ripples, overshoot and ringing at drain-source connections of switching devices, and damage to gate-source connections of switching devices due to sizable output currents.

This disclosure provides a low-inductance dual-full bridge power supply module with integrated sensing. As described in more detail below, the power supply module supports the use of at least one dual-full bridge power converter. Each dual-full bridge power converter includes multiple full bridges, where one full bridge is positioned on a main board, another full bridge is positioned on an IMS board, and a transformer couples the two full bridges. Each dual-full bridge power converter may enable bidirectional conversion between higher and lower direct current (DC) voltages, which can be significantly different. Also, a base metal layer of the IMS board can be used as a grounding plane for each dual-full bridge power converter, and split grounding connections can be used by each dual-full bridge power converter. Ripple-handling capacitors can be placed on the IMS board itself, and Kelvin connections can be used with gate-source connections of switching devices on the IMS board. The power supply module also includes various sensors integrated with the IMS board and optionally with the main board, such as current sensors that measure output currents and temperature sensors that measure device temperatures. In some cases, the temperature sensors may be located at or close to specified switching devices, such as the highest-loss switching devices in the power supply module.

In this way, the power supply module can support a number of possible benefits or advantages depending on the implementation. For example, since the ripple-handling capacitors can be placed on the IMS board itself rather than on a separate board (like the main board), this helps to reduce ripple currents and output voltage ripples and helps to avoid overheating of connectors between the boards. Also, using the base metal layer of the IMS board as a grounding plane along with the split grounding connections for each dual-full bridge power converter can significantly reduce inductances within each dual-full bridge power converter. Further, improved component placement can be used to help reduce or avoid overshoot and ringing, and the Kelvin connections can be used to avoid damage to the gate-source connections of the switching devices. In addition, the use of multiple dual-full bridge power converters can provide redundancy in the operation of the power supply module, which may be necessary or desirable in various applications (such as automotive applications). All of this can be achieved using a compact design that can be easily adaptable over time, and the use of a single-layer IMS board facilitates easy manufacturability. It is also possible for multiple dual-full bridge power converters to have identical designs and for simple connectors to be used, which can reduce component variability and overall costs.

FIG. 1 illustrates an example low-inductance dual-full bridge power supply module 100 according to this disclosure. The power supply module 100 here is generally used to convert between a higher DC voltage and a lower DC voltage. As a particular example, the power supply module 100 may be used to convert between (i) a higher DC voltage of about 240 volts to about 410 volts and (ii) a lower DC voltage of about 9 volts to about 16 volts. The power supply module 100 can also support any suitable amount of power transfer between the higher-voltage and lower-voltage domains. As a particular example, the power supply module 100 may support a nominal continuous power transfer rate of about 1.8 kilowatts. However, these values are examples only, and the power supply module 100 may be used to convert between any other suitable voltages and may support any other suitable power transfer rates. In addition, depending on the implementation, the power supply module 100 may support bidirectional power transfer, meaning the power supply module 100 may allow power transfer from the higher-voltage domain to the lower-voltage domain or from the lower-voltage domain to the higher-voltage domain depending on the operating mode of the power supply module 100.

As shown in FIG. 1, the power supply module 100 includes a housing 102 and a cover 104. The housing 102 is configured to receive other components of the power supply module 100 into an internal space defined within the housing 102, and the cover 104 is configured to be attached to the housing 102 in order to close the internal space within the housing 102. The housing 102 and the cover 104 may each be formed from any suitable material(s), such as one or more metals like steel. Also, the housing 102 and the cover 104 may each be formed in any suitable manner. In addition, the housing 102 and the cover 104 may each have any suitable size, shape, and dimensions. In this particular example, the cover 104 is generally flat and attaches to the top of the housing 102, although the housing 102 and the cover 104 may have any other suitable forms. In some cases, the cover 104 can be sealed to the housing 102 in order to help seal the internal space within the housing 102, which can protect other components of the power supply module 100 (such as from moisture penetration).

Higher-voltage connectors 106, lower-voltage terminals 108, and a common lower-voltage connector 110 are used to electrically couple the power supply module 100 to components in the higher-voltage and lower-voltage domains. For example, each of the higher-voltage connectors 106 may be used to electrically couple the power supply module 100 to one or more batteries, super-capacitors, or other source(s) of a higher electrical voltage. In this example, there are multiple higher-voltage connectors 106 that allow the power supply module 100 to be coupled to multiple higher-voltage sources, which may be useful for providing redundancy. Note, however, that the use of multiple higher-voltage connectors 106 is not required, and the power supply module 100 may include any suitable number of higher-voltage connectors 106. Each of the lower-voltage terminals 108 may be used to electrically couple the power supply module 100 to one or more batteries, super-capacitors, or other source(s) of a lower electrical voltage and/or to one or more lower-voltage loads. For instance, each of the lower-voltage terminals 108 may be coupled to one of multiple DC buses, where each DC bus may include a bus fuse and is coupled to one or more lower-voltage batteries (such as a 12-volt lead-acid or other battery) and/or one or more lower-voltage loads. The common lower-voltage connector 110 may be coupled to one or more lower-voltage loads that receive and use electrical power from the multiple DC buses, such as a vehicle integration control module, which again may be useful for providing redundancy. Note, however, that the use of multiple lower-voltage connectors 108 and the use of the common lower-voltage connector 110 are not required, and the power supply module 100 may include any suitable number of lower-voltage connectors 108 and/or any suitable number of common lower-voltage connectors 110.

A main board 112 includes a printed circuit board (PCB) or other substrate that carries various electrical components of the power supply module 100, and an insulated metal substrate (IMS) board 114 includes another substrate that carries other electrical components of the power supply module 100. For example, the main board 112 may carry connection points that can be electrically coupled to lead wires of the higher-voltage connectors 106, which can connect the main board 112 to the higher-voltage domain. The main board 112 may also carry metal-oxide semiconductor field effect transistor (MOSFET) clamps or other devices used to clamp excess voltages and prevent the excess voltages from damaging other components of the power supply module 100. As described below, the main board 112 further carries capacitors, switches, inductors, and other components that form at least part of at least one higher-voltage portion of at least one dual-full bridge power converter (including a full bridge of each dual-full bridge power converter). Note that the main board 112 may carry any suitable components as needed or desired to support one or more functions in the power supply module 100.

The IMS board 114 can be electrically coupled to the lower-voltage terminals 108 and may carry connection points that can be electrically coupled to lead wires of the common lower-voltage connector 110, which can connect the IMS board 114 to the lower-voltage domain. As described below, the IMS board 114 carries capacitors, switches, and other components that form at least part of at least one lower-voltage portion of at least one dual-full bridge power converter (including another full bridge of each dual-full bridge power converter) The IMS board 114 generally includes a base metal layer, such as one formed from aluminum, copper, or other metal(s). An insulative dielectric material, such as polymer or ceramic, is formed over the base metal layer. Conductive traces, such as those formed from copper or other metal(s), are formed over the insulative dielectric material, and circuit components can be mounted on or otherwise coupled to the conductive traces. This type of construction allows the IMS board 114 to dissipate large amounts of heat generated by electrical components and other components coupled to or otherwise carried by the IMS board 114. Note that the IMS board 114 can carry any suitable components as needed or desired to support one or more functions in the power supply module 100.

Transformers 116 are electrically coupled to circuit components carried by the main board 112 and the IMS board 114. As described below, each transformer 116 is used to electrically couple a full bridge carried by the main board 112 and a full bridge carried by the IMS board 114 to form a dual-full bridge power converter. Each transformer 116 also helps to provide electrical isolation between the higher-voltage and lower-voltage domains that are coupled to the power supply module 100. Each transformer 116 includes any suitable electrical transformer, such as a 20:1 transformer. In this example, there are two transformers 116 since the power supply module 100 supports the use of two dual-full bridge power converters. However, other numbers of transformers 116 may be used if the power supply module 100 supports other numbers of dual-full bridge power converters.

To help with thermal management of the power supply module 100, thermal pads 118 can be used to facilitate the transfer of thermal energy from the transformers 116 and from the main and IMS boards 112 and 114 (or from components carried by the main and IMS boards 112 and 114) into the housing 102. The thermal pads 118 may be formed from any suitable thermally-conductive material(s), such as a thermal interface material (TIM), and in any suitable manner. Also, each thermal pad 118 may have any suitable size, shape, and dimensions and be positioned at any suitable location to facilitate the transfer of thermal energy. One or more hose fittings 120 may be used to allow a coolant (such as a liquid or other fluid coolant) to flow through the housing 102 and to remove thermal energy from the housing 102, thereby helping to cool the power supply module 100. Note, however, that any other or additional thermal management technique(s) may be used in the power supply module 100.

Although FIG. 1 illustrates one example of a low-inductance dual-full bridge power supply module 100, various changes may be made to FIG. 1. For example, the sizes, shapes, and dimensions of the power supply module 100 and the various components of the power supply module 100 can easily vary according to particular needs. Also, while the power supply module 100 is often described as containing two dual-full bridge power converters, the power supply module 100 may include any suitable number of dual-full bridge power converters (including a single dual-full bridge power converter). In addition, FIG. 1 illustrates one example of a power supply module 100 in which an IMS board 114 designed as described below may be used. However, IMS boards 114 may be used in any other suitable power supply modules and are not limited to use in the specific power supply module 100 shown in FIG. 1.

Figure 2:
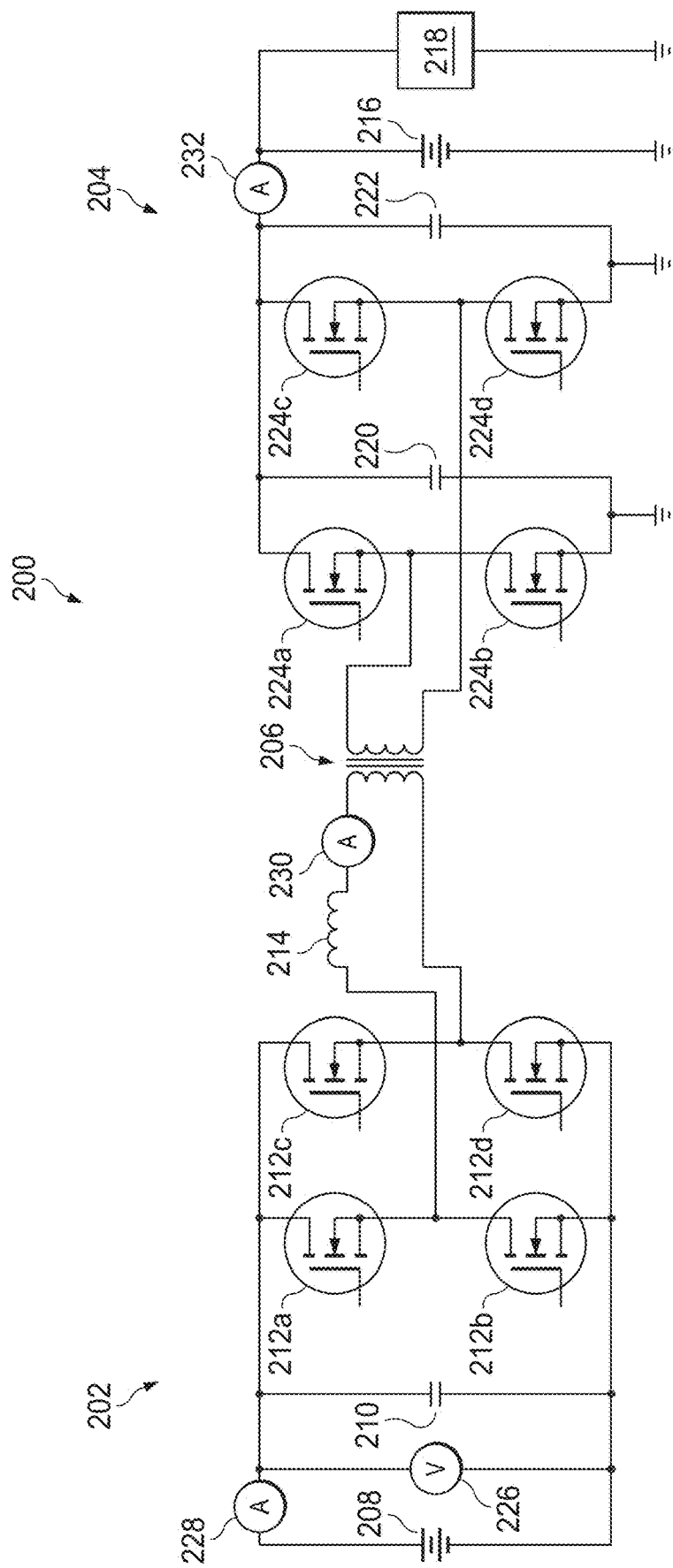
FIG. 2 illustrates an example dual-full bridge power converter with integrated sensing according to this disclosure.

FIG. 2 illustrates an example dual-full bridge power converter 200 with integrated sensing according to this disclosure. As shown in FIG. 2, the power converter 200 includes a higher-voltage side 202 and a lower-voltage side 204 that are coupled together by a transformer 206. The transformer 206 here may represent one of the transformers 116 in the power supply module 100 shown in FIG. 1 and discussed above.

The higher-voltage side 202 of the power converter 200 is configured to be coupled to a higher-voltage domain, which in this example includes at least one higher-voltage battery or other higher-voltage power supply 208. The power supply 208 may provide any suitable voltage at a higher level relative to the lower-voltage domain, such as about 240 volts to about 410 volts. The power supply 208 may represent a single power supply or a collection of power supplies coupled together in series and/or in parallel to provide the desired voltage.

The higher-voltage side 202 of the power converter 200 includes a capacitor 210 configured to be coupled in parallel across the power supply 208. The capacitor 210 may be charged by the power supply 208, and electrical energy stored on the capacitor 210 may be provided to the transformer 206 via a collection of electrical switches 212a-212d forming a first full bridge. Here, the electrical switches 212a-212b are coupled in series with one another, and the series-connected electrical switches 212a-212b are coupled in parallel across the power supply 208. Similarly, the electrical switches 212c-212d are coupled in series with one another, and the series-connected electrical switches 212c-212d are coupled in parallel across the power supply 208. The higher-voltage side of the transformer 206 is coupled to one point between the electrical switches 212a-212b via an inductor 214 and to another point between the electrical switches 212c-212d. The electrical switches 212a-212d can be opened and closed (as part of full bridge power converter control) to transfer electrical energy between the capacitor 210 and the transformer 206, which supports DC power conversion between the higher-voltage and lower-voltage domains.

The lower-voltage side 204 of the power converter 200 is configured to be coupled to a lower-voltage domain, which in this example includes at least one lower-voltage battery or other lower-voltage power supply 216 and/or one or more lower-voltage loads 218. The power supply 216 may provide any suitable voltage at a lower level relative to the higher-voltage domain, such as about 9 volts to about 16 volts. The power supply 216 may represent a single power supply or a collection of power supplies coupled together in series and/or in parallel to provide the desired voltage. The one or more loads 218 may represent any suitable component(s) that operate using the voltage provided by the lower-voltage side 204 of the power converter 200, such as one or more components coupled to at least one DC bus.

The lower-voltage side 204 of the power converter 200 includes capacitors 220 and 222, each of which is configured to be coupled in parallel across the power supply 216 and/or the one or more loads 218. The capacitors 220 and 222 may be charged by electrical energy from the transformer 206, and the electrical energy stored on the capacitors 220 and 222 may be provided to the power supply 216 and/or the one or more loads 218. The charging and discharging of the capacitors 220 and 222 can be controlled via a collection of electrical switches 224a-224d forming a second full bridge. Here, the electrical switches 224a-224b are coupled in series with one another, and the series-connected electrical switches 224a-224b are coupled in parallel across the power supply 216 and/or the one or more loads 218. Similarly, the electrical switches 224c-224d are coupled in series with one another, and the series-connected electrical switches 224c-224d are coupled in parallel across the power supply 216 and/or the one or more loads 218. The lower-voltage side of the transformer 206 is coupled to one point between the electrical switches 224a-224b and to another point between the electrical switches 224c-224d. The electrical switches 224a-224d can be opened and closed (as part of full bridge power converter control) to transfer electrical energy between the transformer 206 and the capacitors 220 and 222, which supports DC power conversion between the higher-voltage and lower-voltage domains.

In some cases, the power converter 200 can operate bidirectionally to convert the higher voltage to the lower voltage in one direction and to allow the capacitor 210 to be pre-charged using energy from the lower-voltage domain in the other direction. In general, the full bridge that is used to provide electrical energy to a transformer 206 may be referred to as a "primary side" full bridge, and the full bridge that is used to receive electrical energy from the transformer 206 may be referred to as a "secondary side" full bridge.

Each capacitor 210, 220, 222 includes any suitable capacitive structure having any suitable capacitance. In general, the capacitance of each capacitor 210, 220, 222 can vary based on (among other things) the voltage to be stored on the capacitor 210, 220, 222. The inductor 214 includes any suitable inductive structure having any suitable inductance. In general, the inductance of the inductor 214 can vary based on (among other things) the electrical current to pass through the inductor 214. In some cases, the inductor 214 may have an inductance of about 25 µH. Each switch 212a-212d, 224a-224d includes any suitable structure configured to selectively form and break an electrical connection, such as a MOSFET or other transistor.

The power converter 200 here also includes various sensors integrated into the power converter 200. For example, a voltage sensor 226 and a current sensor 228 may be used to respectively measure the voltage and the current provided by the power supply 208. The voltage sensor 226 may be coupled in parallel across the power supply 208, and the current sensor 228 may be coupled in series with the power supply 208. Also, a current sensor 230 may be used to measure the current provided to the transformer 206 by the higher-voltage side 202 of the power converter 200. In addition, a current sensor 232 may be used to measure the current provided by the lower-voltage side 204 of the power converter 200 to the power supply 216 and/or the load(s) 218. The voltage sensor 226 includes any suitable structure configured to measure an electrical voltage, and each current sensor 228, 230, 232 includes any suitable structure configured to measure an electrical current.

One or more instances of the dual-full bridge power converter 200 may be implemented in the power supply module 100 of FIG. 1. For example, various components forming the higher-voltage side 202 of the power converter 200 (including one full bridge) may be positioned on the main board 112, and various components forming the lower-voltage side 204 of the power converter 200 (including another full bridge) may be positioned on the IMS board 114. When multiple instances of the dual-full bridge power converter 200 are implemented in the power supply module 100, various components forming the higher-voltage side 202 of each power converter 200 (including one full bridge of each power converter 200) may be positioned on the main board 112, and various components forming the lower-voltage side 204 of each power converter 200 (including another full bridge of each power converter 200) may be positioned on the IMS board 114. While it is often assumed that two power converters 200 are implemented in the power supply module 100, the power supply module 100 may include any other suitable number of power converters 200.

Note that the full bridges formed using the switches 212a-212d and the switches 224a-224d may be said to represent "active" full bridges. This is because the switches 212*a*-212*d* or 224*a*-224*d* of the associated full bridge may be individually controlled and the switches 212*a*-212*d* and 224*a*-224*d* on opposite sides of the associated transformer 206 may be individually controlled. As a result, the dual-full bridge power converter 200 may be said to represent a dual-active full bridge power converter.

Although FIG. 2 illustrates one example of a dual-full bridge power converter 200 with integrated sensing, various changes may be made to FIG. 2. For example, any suitable circuit element or elements may be used to implement each circuit component or combination of circuit components shown in FIG. 2. Also, the dual-full bridge power converter 200 may incorporate any number of additional features as needed or desired. As a particular example, the dual-full bridge power converter 200 may include or be used in conjunction with one or more temperature sensors, such as a temperature sensor positioned at or near the electrical switch 224*d* and/or other electrical switch(es) of the dual-full bridge power converter 200.

FIGS. 3A through 7B illustrate an example IMS board 114 implementing at least one low-inductance full bridge for use in a dual-full bridge power supply module 100 according to this disclosure. For example, the IMS board 114 may be used to implement the lower-voltage side 204 of one or more instances (such as two instances) of the dual-full bridge power converter 200. The use of multiple instances of the dual-full bridge power converter 200 may be necessary or desirable in various applications, such as for redundancy purposes in automotive applications or other applications (although this is not necessarily required).

Figure 3A:
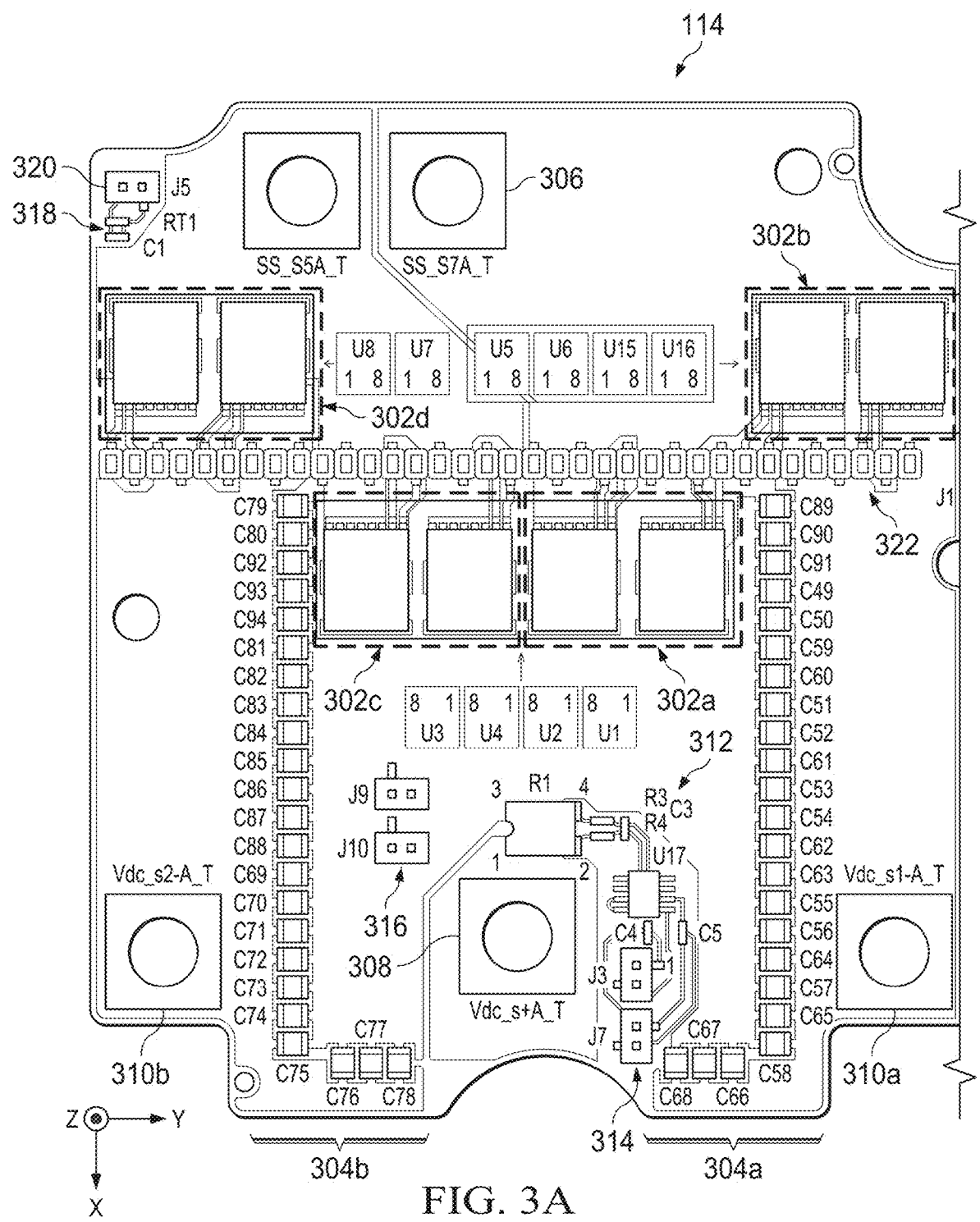
FIGS. 3A through 7B illustrate an example insulated metal substrate (IMS) board implementing at least one low-inductance full bridge for use in a dual-full bridge power supply module according to this disclosure.
Figure 3B:
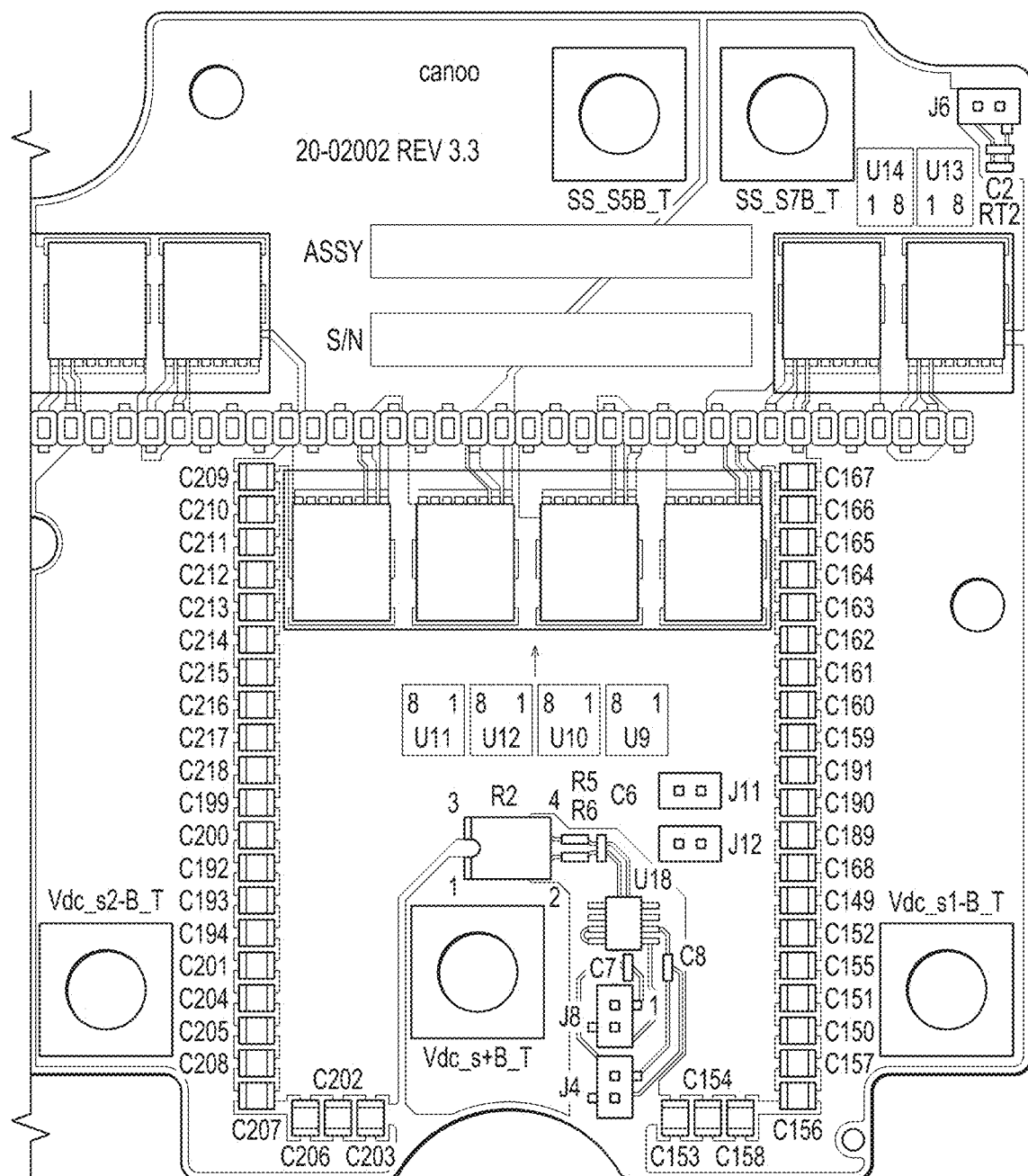

As shown in FIGS. 3A and 3B, the IMS board 114 is used to carry a number of circuit components associated with the two instances of the dual-full bridge power converter 200. In this example, the lower half of the IMS board 114 may carry circuit components associated with one instance of the dual-full bridge power converter 200, and the upper half of the IMS board 114 may carry circuit components associated with another instance of the dual-full bridge power converter 200. Since each instance of the dual-full bridge power converter 200 may be implemented in the same or similar manner, only the circuit components in the lower half of the IMS board 114 are described below.

Each instance of the dual-full bridge power converter 200 in the power supply module 100 includes multiple pairs of electrical switches 302*a*-302*d* forming one full bridge of that power converter 200. Each pair of electrical switches 302*a*-302*d* may, for example, be used to implement one of the electrical switches 224*a*-224*d* shown in FIG. 2 and described above. Each pair of electrical switches 302*a*-302*d* may be positioned side-by-side on the IMS board 114. The use of pairs of electrical switches (rather than individual electrical switches) may be useful in some applications, such as to reduce an amount of electrical current flowing through each individual electrical switch. Each instance of the dual-full bridge power converter 200 in the power supply module 100 also includes multiple collections of capacitors 304*a*-304*b*. Each collection of capacitors 304*a*-304*b* includes a number of individual capacitors, such as ceramic or other capacitors having a relatively small capacitance (like about 10 μF each), coupled to provide a desired overall capacitance. The collections of capacitors 304*a*-304*b* may, for instance, be used to implement the capacitors 220 and 222 shown in FIG. 2 and described above. Each collection of capacitors 304*a*-304*b* may include a number of individual capacitors positioned side-by-side on the IMS board 114. Two transformer connections 306 denote connection points that can be electrically coupled to the transformer 206 shown in FIG. 2 and described above, which again may represent one of the transformers 116 shown in FIG. 1 and described above. An electrical connection 308 denotes a connection point that can be electrically coupled to a lower-voltage domain, such as when the electrical connection 308 is coupled to one of the lower-voltage terminals 108 shown in FIG. 1 and described above.

In this example, each instance of the dual-full bridge power converter 200 in the power supply module 100 supports the use of split grounding connections 310*a*-310*b*. This allows different components of the dual-full bridge power converter 200 (such as different switches forming different portions of the same full bridge) to be coupled to the same ground plane (namely the base metal layer of the IMS board 114). Each instance of the dual-full bridge power converter 200 in the power supply module 100 further includes a current sensor 312, which may represent the current sensor 232 shown in FIG. 2 and described above. The current sensor 312 can be used to measure the output current being provided from the dual-full bridge power converter 200. Connectors 314 may be used to provide outputs from the current sensor 232 to one or more external destinations, such as a controller (possibly on the main board 112) that can adjust operation of the power converter 200 based on the measured current. Connectors 316 may be used as auxiliary power connectors in order to provide auxiliary power to the power converter 200 when needed.

Moreover, each instance of the dual-full bridge power converter 200 in the power supply module 100 includes a temperature sensor 318 and a connector 320. The temperature sensor 318 can be used to sense the temperature at or near the pair of electrical switches 302*d*. The connector 320 may be used to provide an output from the temperature sensor 318 to one or more external destinations, such as a controller (possibly on the main board 112) that can adjust operation of the power converter 200 based on the measured temperature. Note that a common controller or different controllers may use the measured output current and the measured temperature to control the power converter 200. In addition, a connector 322 can be used to provide various signals to and from other components of the power converter 200, such as control signals for the electrical switches 302*a*-302*d*.

Figure 4A:
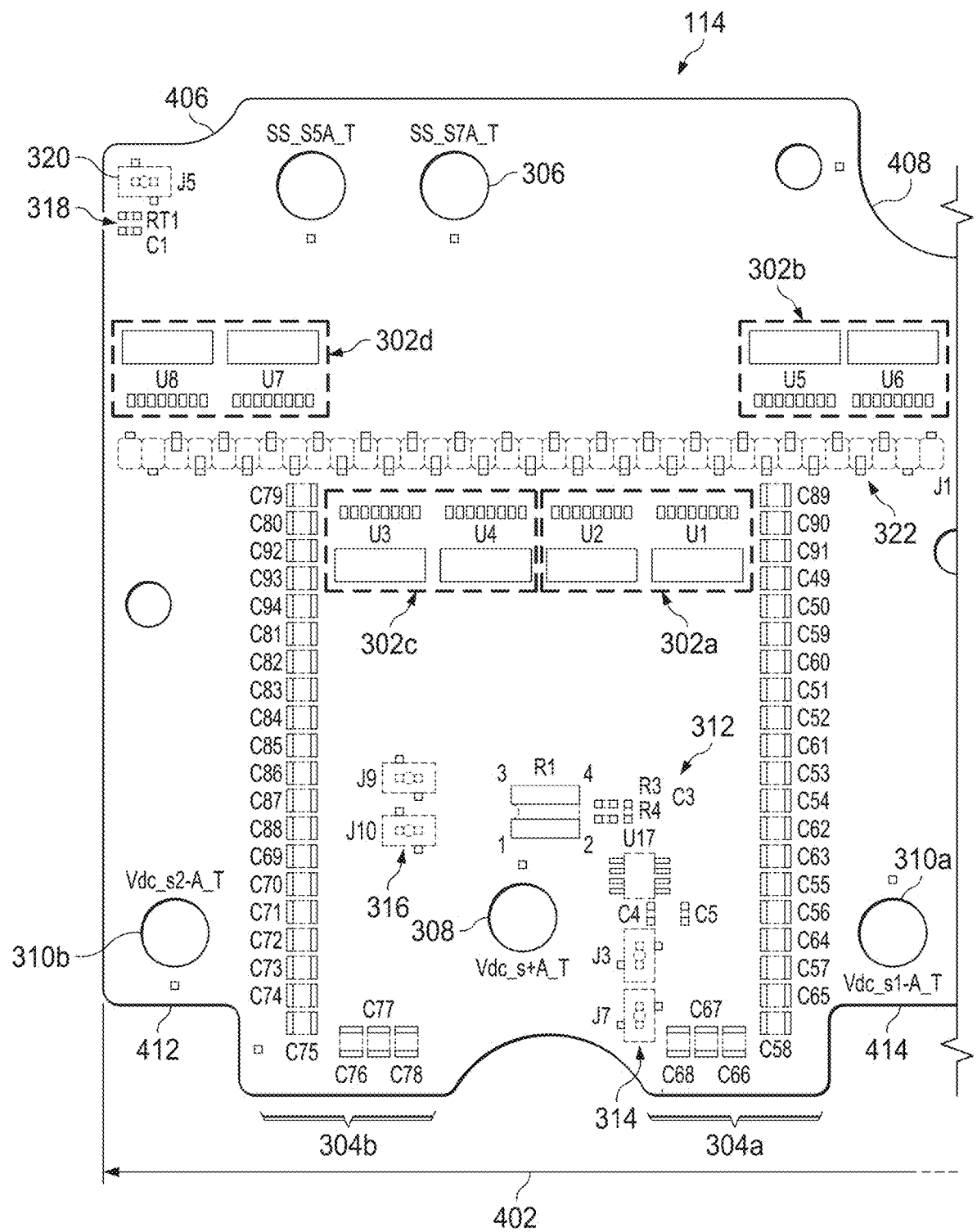
Figure 4B:
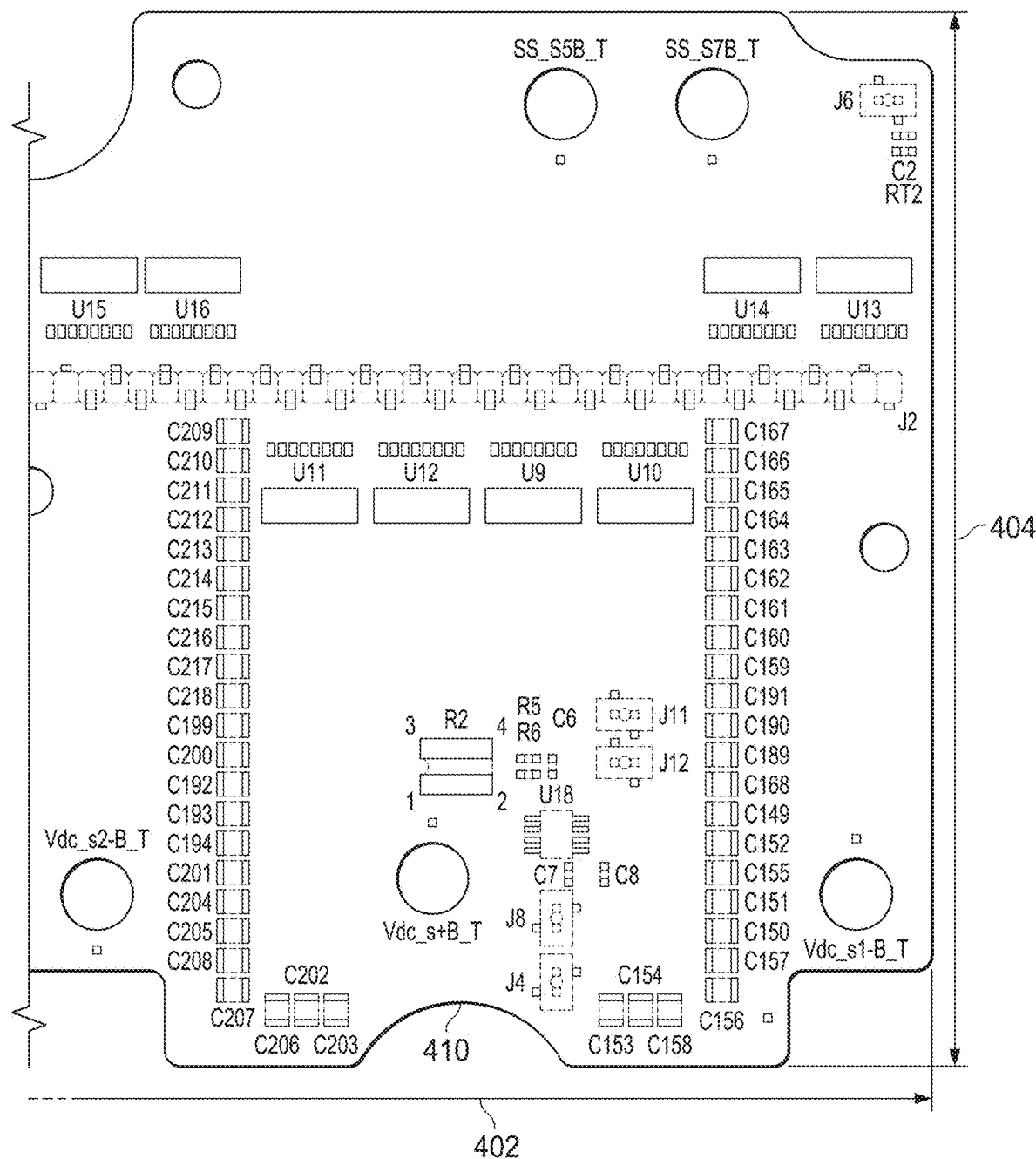

An example of the IMS board 114 without the various electrical components mounted to or formed on the IMS board 114 is shown in FIGS. 4A and 4B, while the reference numerals from FIGS. 3A and 3B are included in FIGS. 4A and 4B to facilitate ease of understanding. The IMS board 114 may have any suitable form factor with any suitable size, shape, and dimensions. For example, the IMS board 114 may have a height 402 of about 188.0 millimeters and a width 404 of about 108.5 millimeters, although these dimensions can vary as needed or desired. Also, in the example shown in FIGS. 4A and 4B, the IMS board 114 includes corner notches 406 that may each have a radius of curvature of about 8.00 millimeters, a notch 408 that may have a radius of curvature of about 10.0 millimeters, and notches 410 that may each have a radius of curvature of about 11.5 millimeters. In addition, in the example shown in FIGS. 4A and 4B, the IMS board 114 includes rectangular notches 412 that may each have a height of about 14.5 millimeters and a rectangular notch 414 that may have a height of about 28.0 millimeters, where corners of the rectangular notches 412 and 414 may each have a radius of curvature of about 2.0 millimeters. Again, however, the notches present on the IMS board 114 and the dimensions of the notches can vary as needed or desired.

Figure 5:
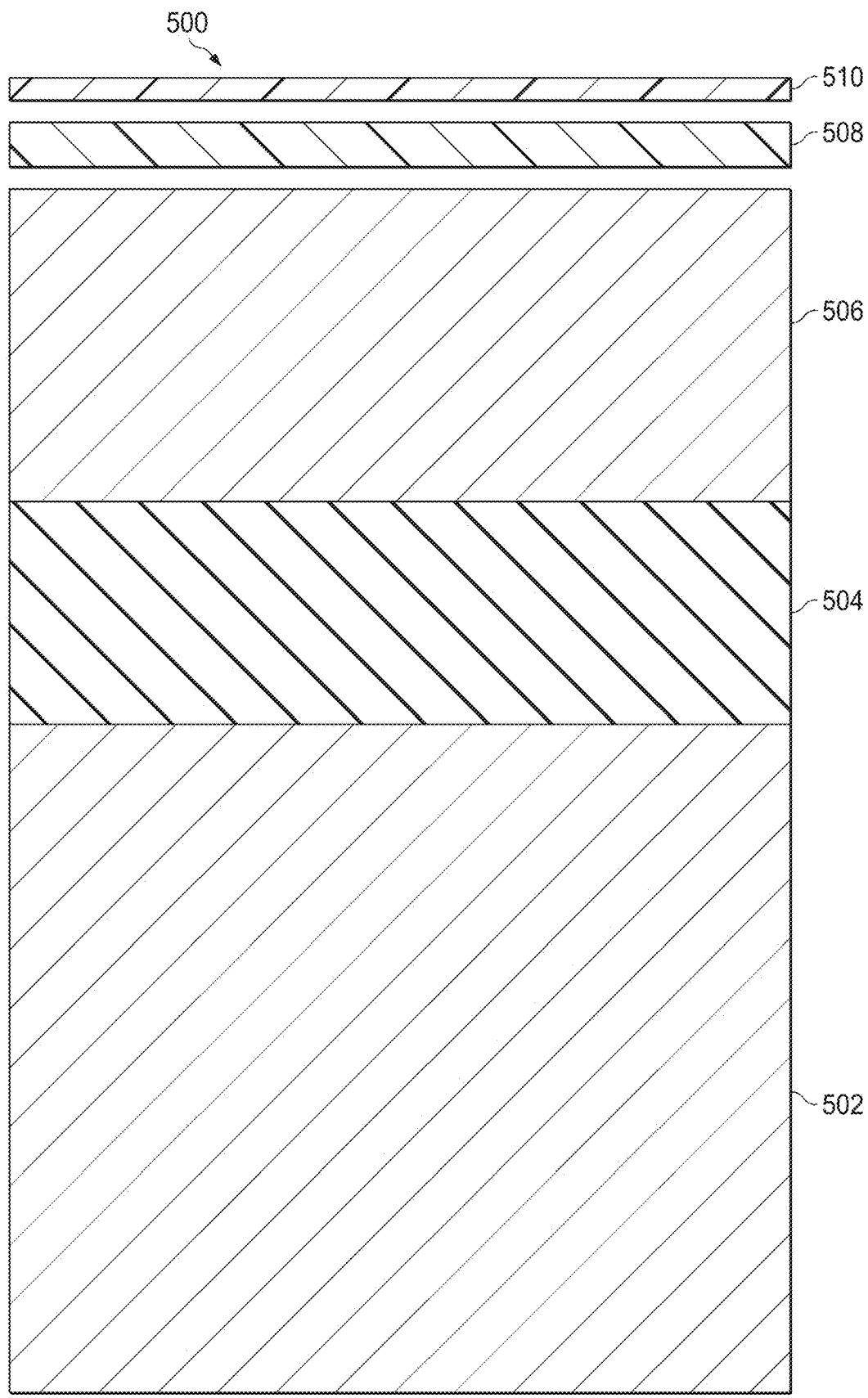
Figure 6A:
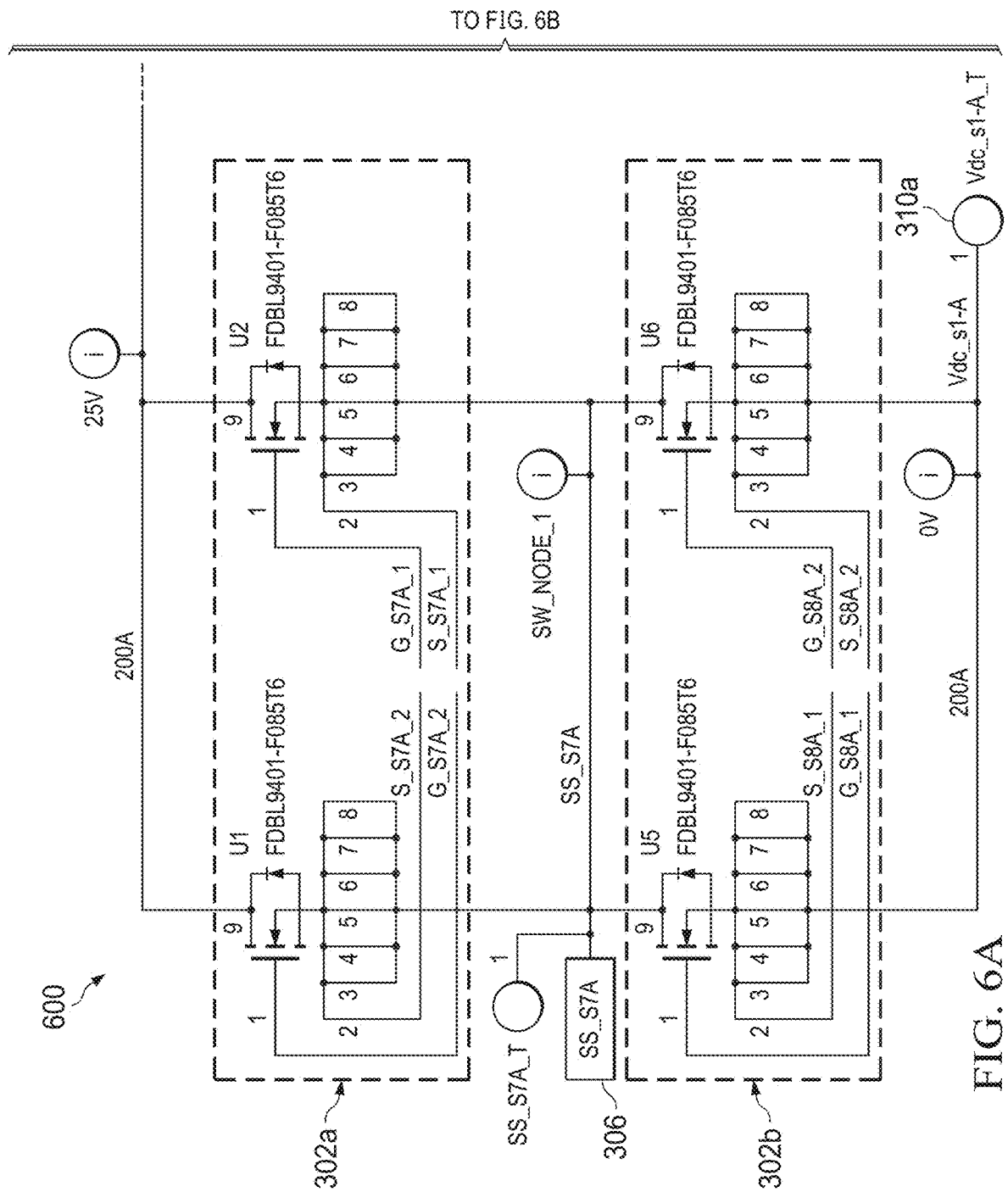
Figure 6B:
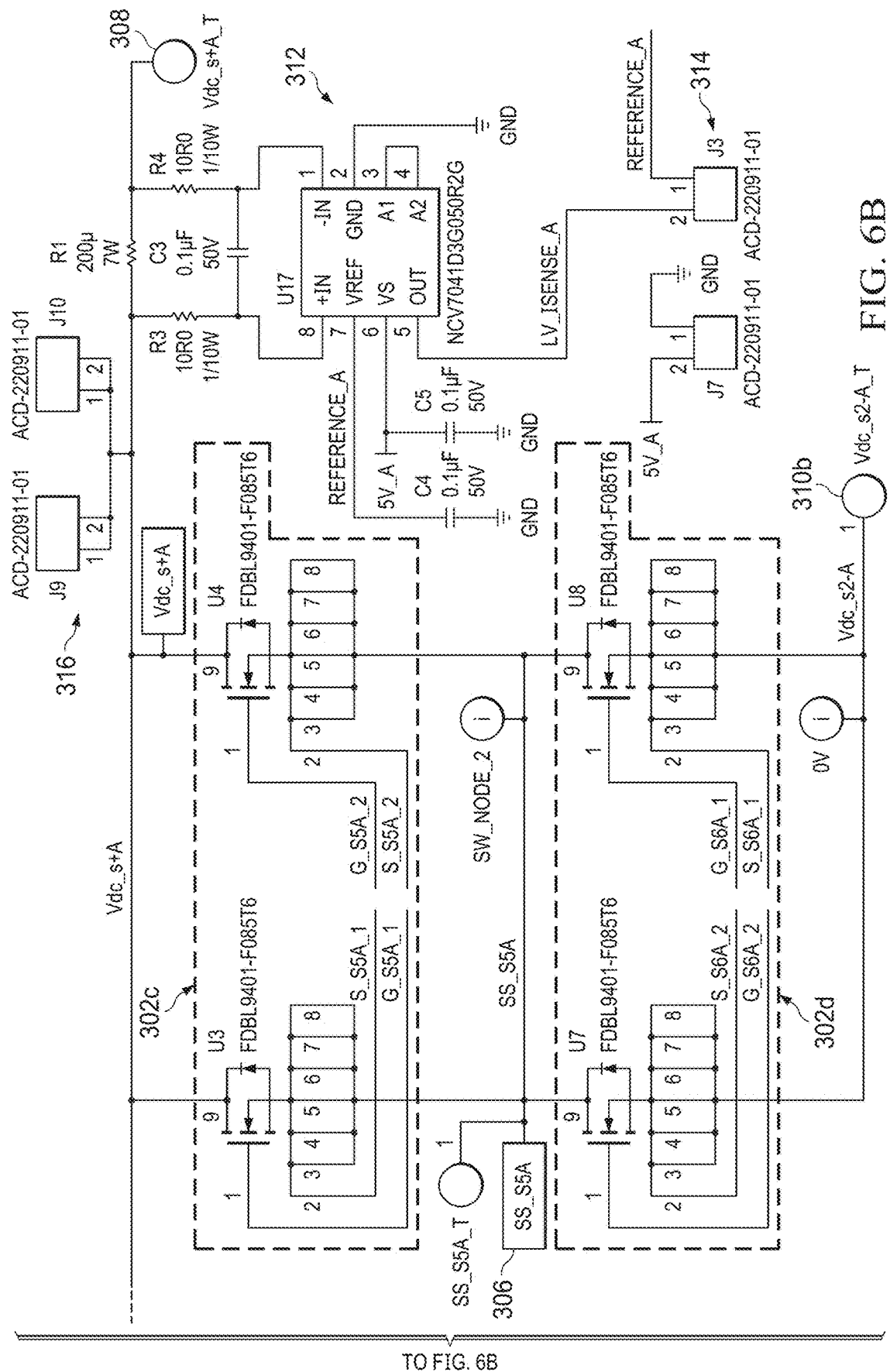
Figure 6C:
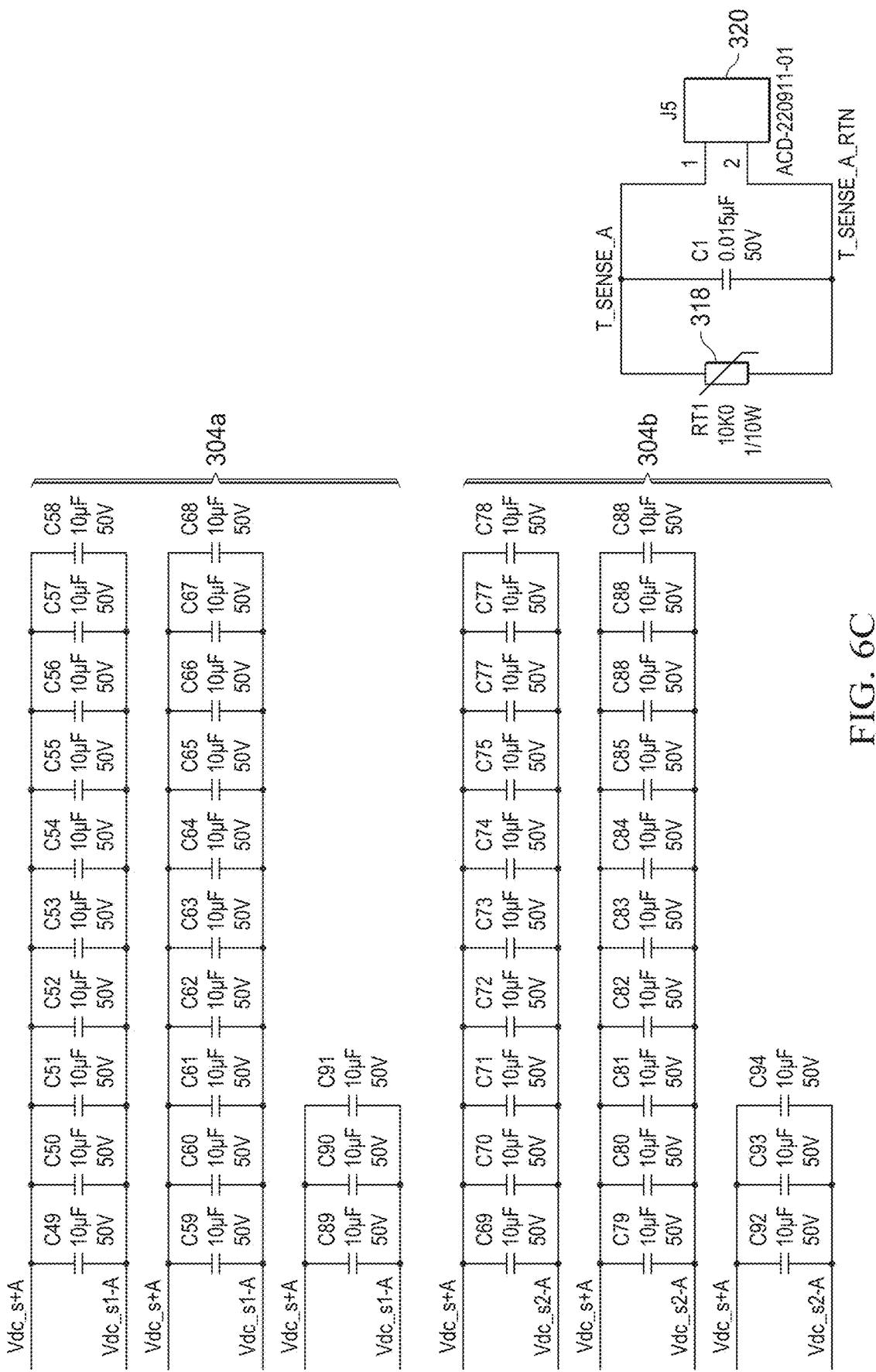
Figure 6D:
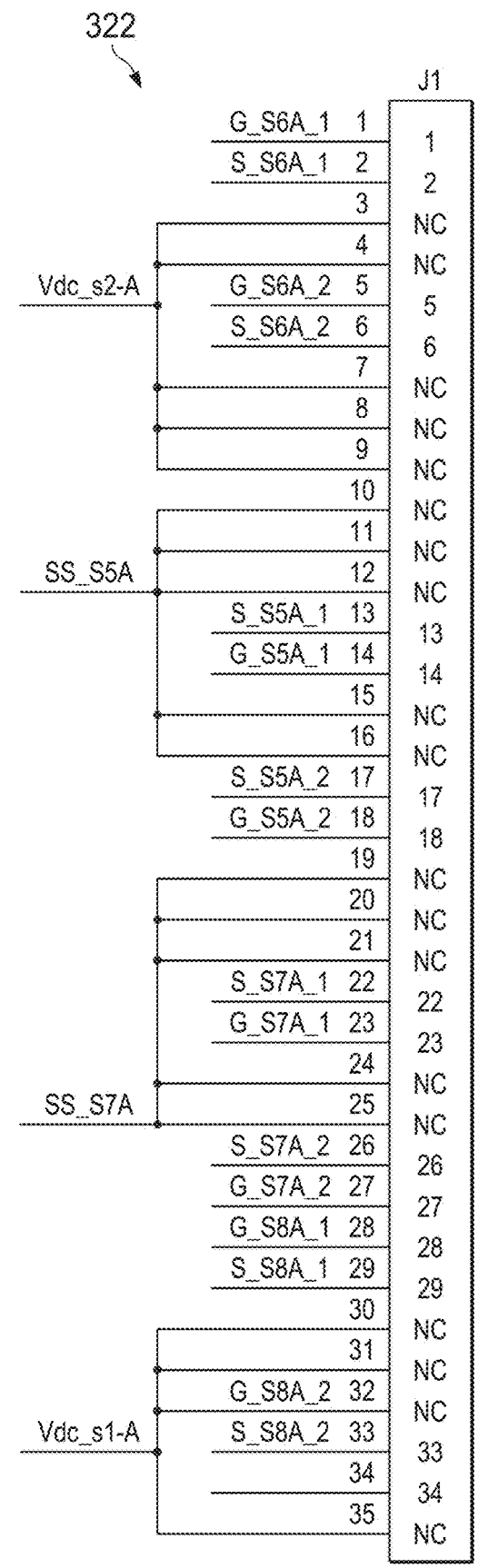

An example cross-section 500 of the IMS board 114 is shown in FIG. 5. As shown in FIG. 5, the IMS board 114 includes a base metal layer 502, which can extend across the IMS board 114 and can be formed from one or more metals like aluminum or copper. In some embodiments, the base metal layer 502 may represent a layer of 5052 or 6061 aluminum, such as a layer that has a nominal thickness of about 1.5 millimeters. A dielectric layer 504 is formed over the base metal layer 502 and functions as an electrical insulator. Any suitable dielectric material may be used in the dielectric layer 504, such as one having a high thermal conductivity. In some embodiments, the dielectric layer 504 may represent a polymer composite that combines epoxy resin and a filler having high thermal conductivity, such as a layer that has a nominal thickness of about 0.1 millimeters. A conductive layer 506 is formed over the dielectric layer 504 and can be patterned to create electrically-conductive traces. Any suitable conductive material may be used in the conductive layer 506, such as one or more metals. In some embodiments, the conductive layer 506 may represent a patterned copper layer, such as a layer that has a nominal thickness of about 0.14 millimeters. A solder mask layer 508 may be formed over the conductive layer 506 and used to couple the conductive layer 506 to electrical components carried by the IMS board 114, such as a layer that has a nominal thickness of about 0.02 millimeters. A protective layer 510 may be formed over the solder mask layer 508 and can have any suitable thickness.

As noted above, the base metal layer 502 of the IMS board 114 can be used as the grounding plane for one full bridge of each instance of the dual-full bridge power converter 200. Here, electrical connections can be formed extending from the base metal layer 502 through the dielectric layer 504 to the split grounding connections 310*a*-310*b* associated with each instance of the dual-full bridge power converter 200. The split grounding connections 310*a*-310*b* can be connected to a chassis or other component of a larger system in order to be grounded. This allows the base metal layer 502 to be grounded and for various electrical connections to be formed between the grounded base metal layer 502 and various electrical components through the dielectric layer 504.

FIGS. 6A through 6D are a circuit schematic 600 of a specific implementation of a portion of the dual-full bridge power converter 200, namely the full bridge that is implemented on or otherwise carried by the IMS board 114. The circuit schematic 600 illustrates how various components such as the pairs of electrical switches 302*a*-302*d*, collections of capacitors 304*a*-304*b*, current sensor 312, and temperature sensor 318 may be implemented. For example, each pair of electrical switches 302*a*-302*d* may be implemented using two parallel-coupled MOSFET switches, and each collection of capacitors 304*a*-304*b* may include multiple groups of parallel-coupled capacitors. Also, the current sensor 312 may be implemented using a sense resistor and an amplifier, and the temperature sensor 318 may be implemented using a thermistor.

This type of design approach for a dual-full bridge power supply module 100 can provide various benefits or advantages depending on the implementation. For example, the output capacitors (the capacitors 304*a*-304*b* implementing the capacitors 220 and 222 of each power converter 200) may be positioned on the IMS board 114 itself rather than on the main board 112, which helps to reduce ripple currents and output voltage ripples. This also helps to avoid the need to provide connectors between the boards 112 and 114 for coupling to and from the output capacitors, which may be useful since those connectors may sometimes overheat. Also, since the IMS board 114 can support effective thermal management, placement of the output capacitors on the IMS board 114 can help to facilitate more effective thermal management of the output capacitors. Moreover, using the base metal layer 502 of the IMS board 114 as a grounding plane and using the split grounding connections 310*a*-310*b* for each power converter 200 can significantly reduce inductances within the dual-full bridge power converters 200. For instance, this may result in the creation of shorter power commutation loops within the power converters 200, which can help to reduce the inductances of the power converters 200. Further, a separate connector 322 may be used to control the electrical switches 302*a*-302*d*, which can help to provide controlled impedances in the control loops for the electrical switches. In addition, in some cases, all of the higher-current electrical paths of the power converters 200 may be present on the IMS board 114, which again can help with thermal management of the power converters 200 since the IMS board 114 can facilitate more effective thermal management.

Figure 7A:
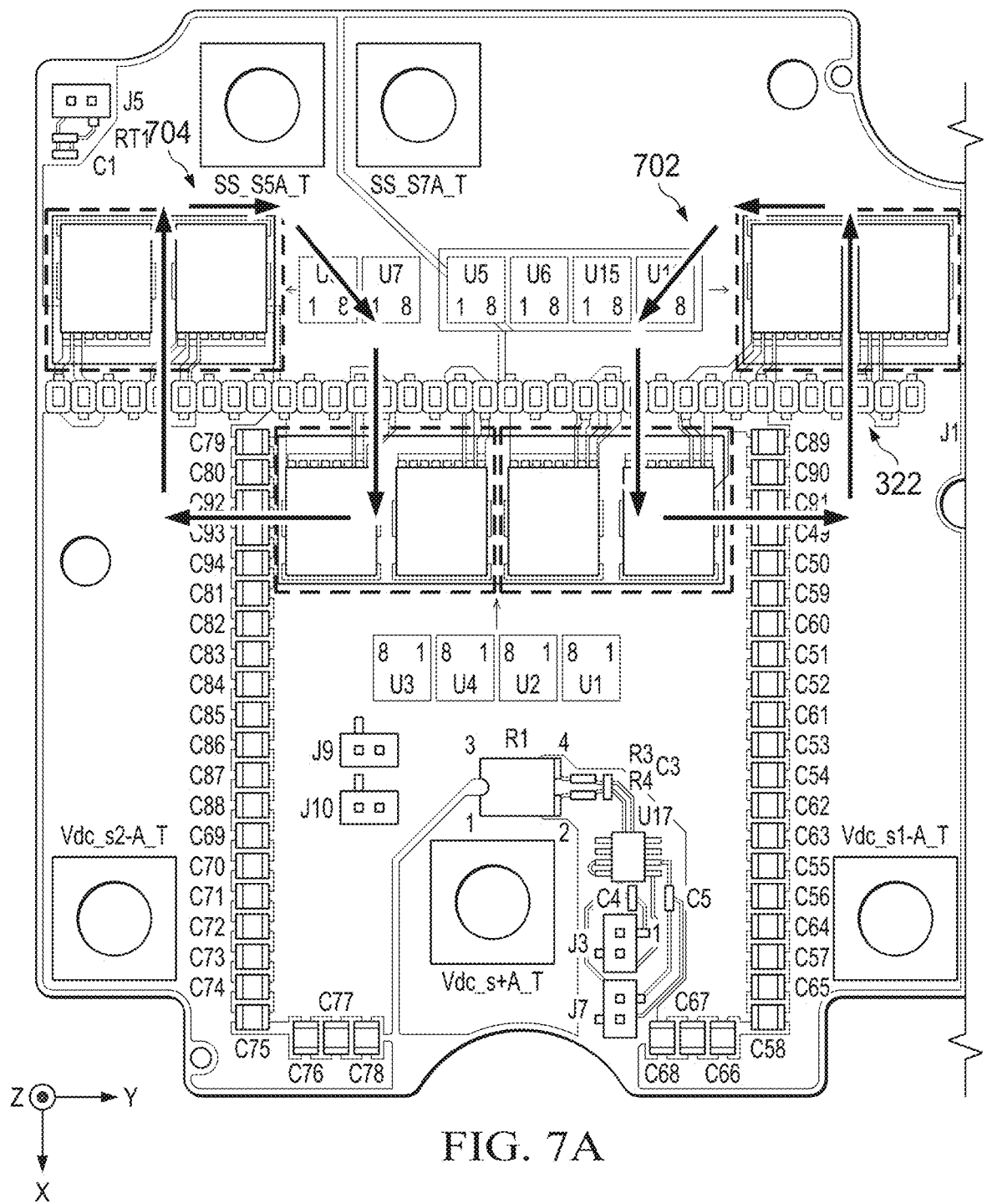
Figure 7B:
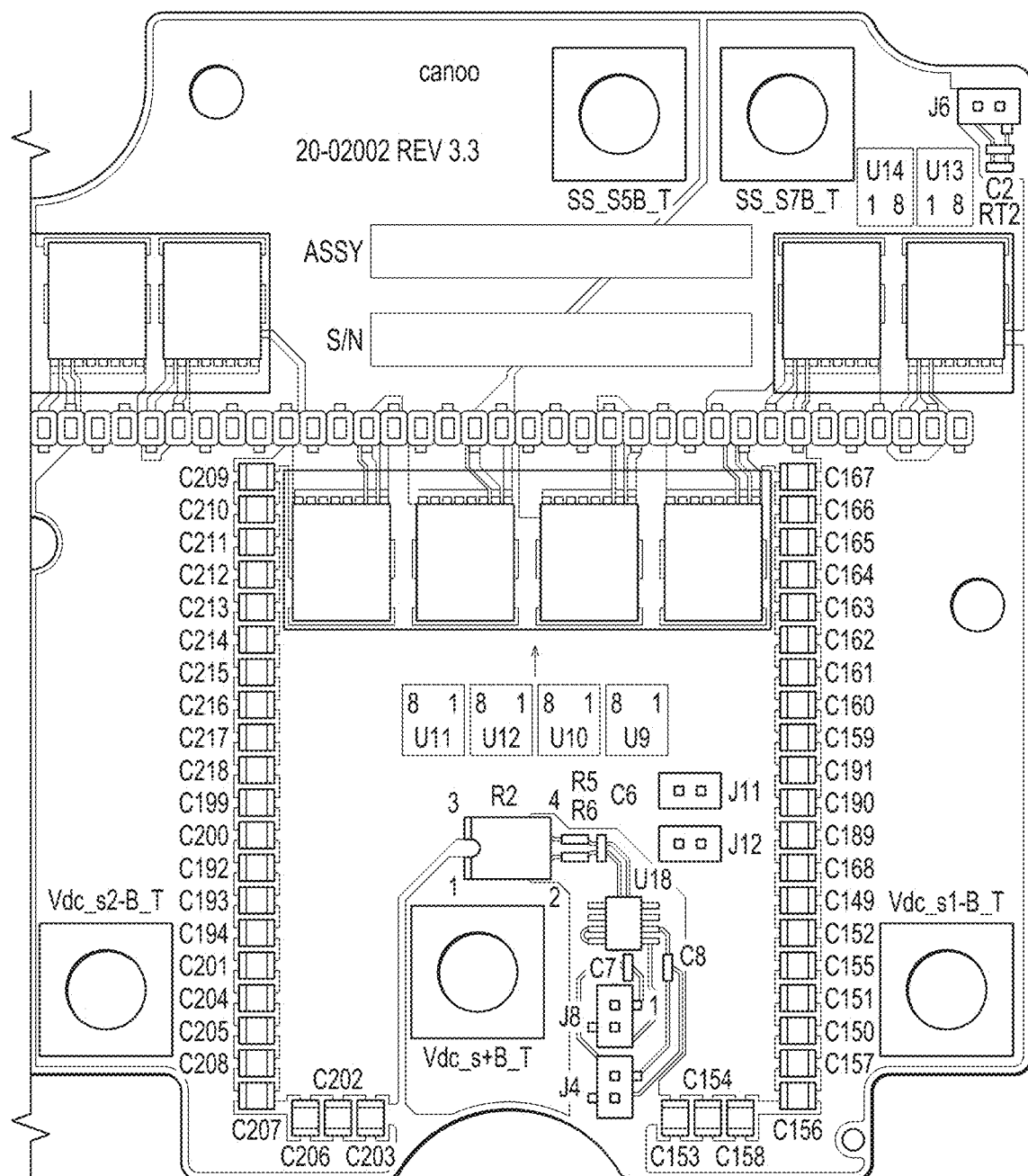

One example of a type of benefit that may be obtained using the IMS board 114 described here is shown in FIGS. 7A and 7B, which illustrates example current commutation loops 702 and 704 within the full bridge of one of the power converters 200 during operation. As can be seen here, the commutation loops 702 and 704 remain within the IMS board 114 and follow relative short current paths through the IMS board 114. These types of commutation current loops can help to achieve lower inductances in the power converters 200, such as when compared to power converters that include the output capacitors on the main board 112 rather than on the IMS board 114.

Although FIGS. 3A through 7B illustrate one example of an IMS board 114 implementing at least one low-inductance full bridge for use in a dual-full bridge power supply module 100, various changes may be made to FIGS. 3A through 7B. For example, the sizes, shapes, and dimensions of the IMS board 114 and the various components of the IMS board 114 can easily vary according to particular needs. Also, while the IMS board 114 is often described as containing full bridges for two dual-full bridge power converters 200, the IMS board 114 may include one or more full bridges for any suitable number of dual-full bridge power converters (including a single dual-full bridge power converter). In addition, any suitable circuit element or elements may be used to implement each circuit component or combination of circuit components shown in FIGS. 3A through 7B.

Figure 8:
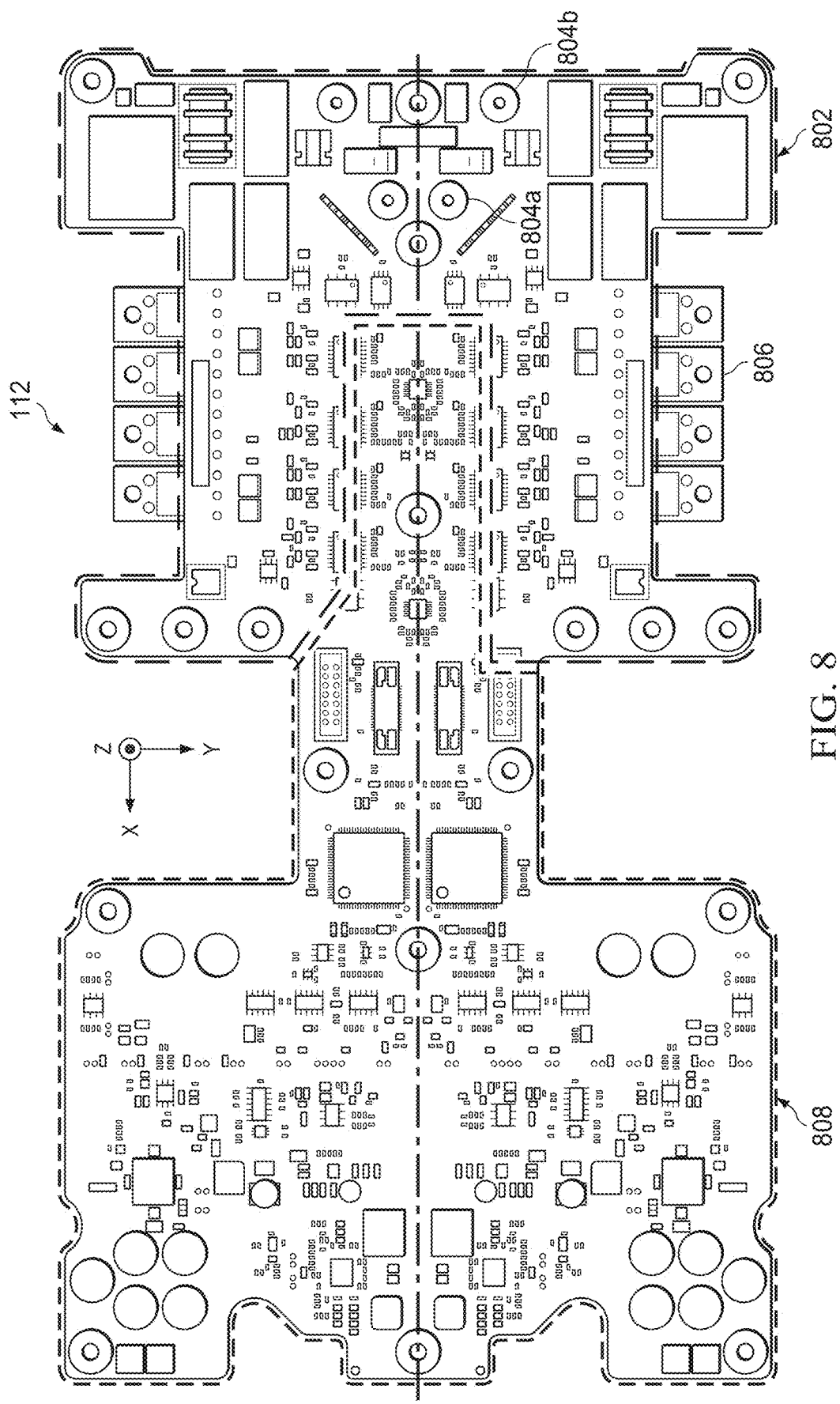
FIG. 8 illustrates an example main board implementing at least one other low-inductance full bridge for use in a dual-full bridge power supply module according to this disclosure.

FIG. 8 illustrates an example main board 122 implementing at least one other low-inductance full bridge for use in a dual-full bridge power supply module 100 according to this disclosure. For example, the main board 112 may be used to implement the higher-voltage side 202 of one or more instances (such as two instances) of the dual-full bridge power converter 200. Again, the use of multiple instances of the dual-full bridge power converter 200 may be necessary or desirable in various applications, such as for redundancy purposes in automotive applications or other applications (although this is not necessarily required).

As shown in FIG. 8, the main board 112 is used to carry a number of additional circuit components associated with the two instances of the dual-full bridge power converter 200. In this example, the lower half of the main board 112 may carry circuit components associated with one instance of the dual-full bridge power converter 200, and the upper half of the main board 112 may carry circuit components associated with another instance of the dual-full bridge power converter 200. Since each instance of the dual-full bridge power converter 200 may be implemented in the same or similar manner, only the circuit components in the lower half of the main board 112 are described below.

For each instance of the dual-full bridge power converter 200 here, the main board 112 includes a collection of components 802 forming the higher-voltage side 202 of the power converter 200. This may include, for example, electrical connections 804a-804b, which denote connection points that can be electrically coupled to a higher-voltage domain, such as when the electrical connections 804a-804b can be coupled to one of the higher-voltage connectors 106 shown in FIG. 1 and described above. This may also include electrical switches 806 forming another full bridge of that power converter 200, where the switches 806 may be used to implement the electrical switches 212a-212d shown in FIG. 2 and described above. This may further include other components used to implement the higher-voltage side 202 of the power converter 200, such as drivers for controlling the operations of the electrical switches 806 and a clamp for protecting against excessive voltages.

For each instance of the dual-full bridge power converter 200 here, the main board 112 also includes a collection of components 808 forming another part of (or being used in conjunction with) the lower-voltage side 204 of the power converter 200. This may include, for example, drivers for controlling the operations of the electrical switches 212a-212d or 302a-302d. This may also include an auxiliary power supply for the IMS board 114, which can provide auxiliary power as needed to the IMS board 114 via the connectors 316. This may further include a micro-controller unit (MCU) or other controller that controls one or more operations of the power supply module 100, such as by controlling the operations of the electrical switches of the power supply module 100 based on current measurements, temperature measurements, and/or other measurements associated with the main board 112, the IMS board 114, or other components of the power supply module 100.

Although FIG. 8 illustrates one example of a main board 112 implementing another portion of a low-inductance dual-full bridge power converter with integrated sensing, various changes may be made to FIG. 8. For example, the sizes, shapes, and dimensions of the main board 112 and the various components of the main board 112 can easily vary according to particular needs. Also, while the main board 112 is often described as containing full bridges for two dual-full bridge power converters 200, the main board 112 may include one or more full bridges for any suitable number of dual-full bridge power converters (including a single dual-full bridge power converter). In addition, any suitable circuit element or elements may be used to implement each circuit component or combination of circuit components shown in FIG. 8.

Figure 9:
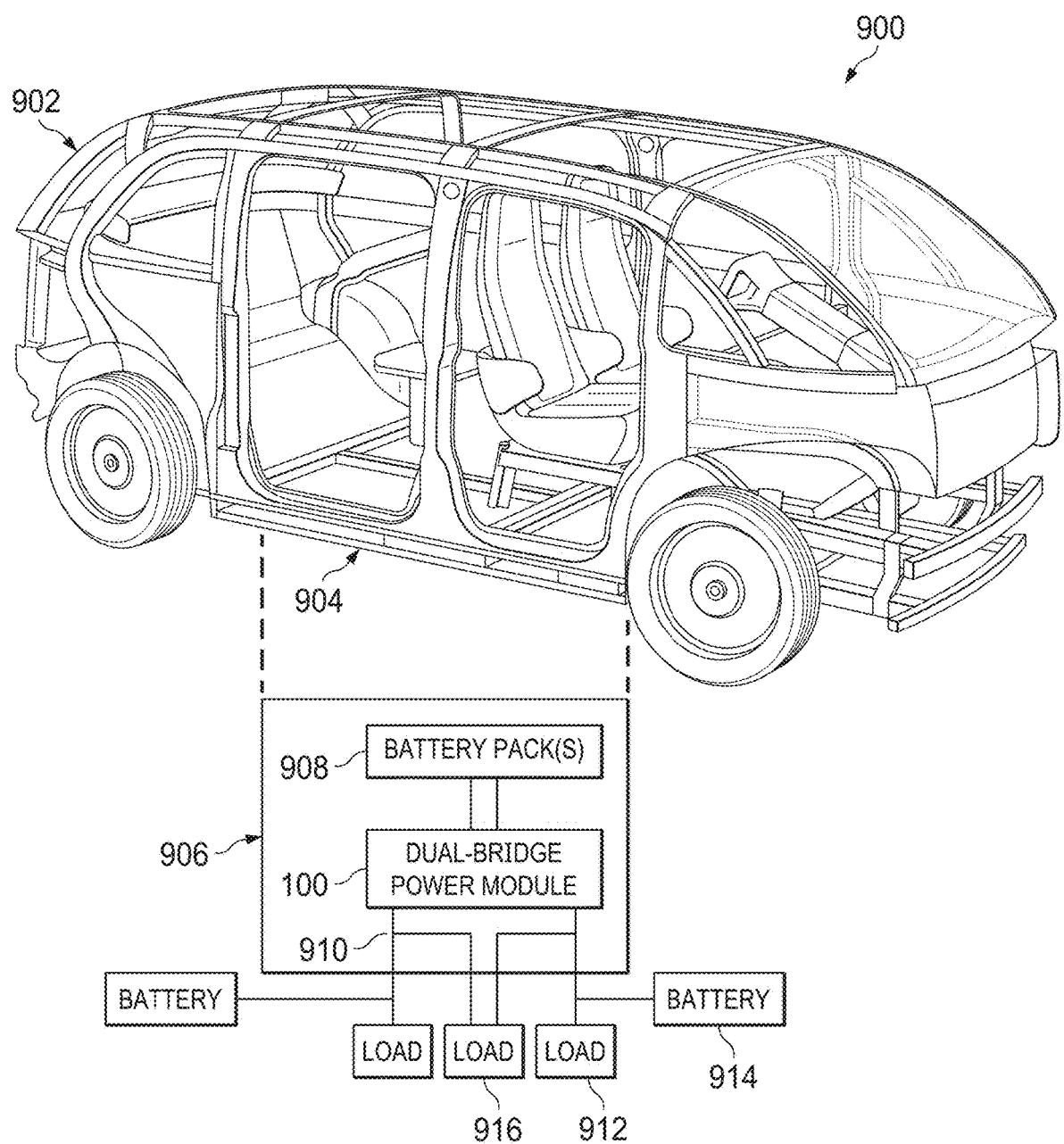
FIG. 9 illustrates an example use of a low-inductance dual-full bridge power supply module according to this disclosure.

FIG. 9 illustrates an example use of a low-inductance dual-full bridge power supply module 100 according to this disclosure. More specifically, FIG. 9 illustrates an example electric vehicle 900 containing a low-inductance dual-full bridge power supply module 100. As shown in FIG. 9, the electric vehicle 900 generally includes a vehicle body 902 attached to a vehicle base 904 (which is also sometimes referred to as a skateboard). The vehicle body 902 in this example takes the form of a passenger van, although vehicle bodies for other types of vehicles (such as sedans, trucks, or other vehicle types) may be used. The vehicle base 904 includes many of the components used to move and stop the electric vehicle 900, such as one or more electric motors, brake systems, suspensions, transmissions, and other components.

In this example, the vehicle base 904 includes a power supply subsystem 906, which includes one or more battery packs 908 and the power supply module 100. The one or more battery packs 908 are generally responsible for providing electrical power to other components of the electric vehicle 900 during use. The one or more battery packs 908 are also rechargeable so that the electrical energy stored in the one or more battery packs 908 can be replenished as needed over time.

The power supply module 100 here receives electrical energy from the one or more battery packs 908 and outputs lower-voltage electrical signals over one or more DC buses 910. Each DC bus 910 may include a bus fuse and is coupled to one or more loads 912 and one or more lower-voltage batteries 914. Each load 912 may represent a component or subsystem of the electric vehicle 900 that operates using electrical power received over its associated DC bus 910. Each lower-voltage battery 914 may represent a 12-volt or other battery that can store electrical energy, such as for use by one or more loads 912. One or more loads 914 may use electrical energy from multiple DC buses 910, which may (among other things) support redundant operation of the load(s) 914 in the event of a failure related to one of the DC buses 910. This may be useful, for instance, when the load(s) 914 include a vehicle integration control module or other module used to control one or more higher-priority functions of the electric vehicle 900 (like functions related to steering control).

Although FIG. 9 illustrates one example use of a low-inductance dual-full bridge power supply module 100, various changes may be made to FIG. 9. For example, one or more low-inductance dual-full bridge power supply modules 100 may be used in any other suitable vehicles. Also, low-inductance dual-full bridge power supply modules 100 may be in any other suitable device or system.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor,"

or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an insulated metal substrate (IMS) board comprising a base metal layer and a conductive layer separated by a dielectric layer;
a full bridge of a dual-full bridge power converter configured to convert between a higher electrical voltage and a lower electrical voltage, the full bridge carried by the IMS board and electrically coupled to the conductive layer, the full bridge comprising multiple electrical switches configured to selectively form and break electrical connections with a transformer of the dual-full bridge power converter, and
at least one output capacitor carried by the IMS board, the at least one output capacitor coupled to the full bridge and configured to store electrical energy;
wherein the base metal layer is configured as a grounding plane for the full bridge; and
wherein the full bridge has split ground connections to the grounding plane.

2. The apparatus of claim 1, further comprising:
a second full bridge of a second dual-full bridge power converter, the second full bridge carried by the IMS board and electrically coupled to the conductive layer, the second full bridge comprising multiple second electrical switches configured to selectively form and break electrical connections with a second transformer of the second dual-full bridge power converter; and
at least one second output capacitor carried by the IMS board, the at least one second output capacitor coupled to the second full bridge and configured to store electrical energy.

3. The apparatus of claim 2, wherein:
the electrical switches of the full bridges are arranged in pairs positioned side-by-side on the IMS board; and
each of the output capacitors comprises multiple capacitors positioned side-by-side on the IMS board.

4. The apparatus of claim 1, further comprising:
a current sensor configured to measure an output current of the full bridge; and
a temperature sensor configured to measure a temperature proximate to at least one of the electrical switches.

5. The apparatus of claim 1, wherein:
the at least one output capacitor comprises a first capacitor and a second capacitor; and
the electrical switches comprise:
first and second electrical switches coupled in series with one another and collectively coupled in parallel across the first capacitor, the second electrical switch and the first capacitor coupled to a first of the split ground connections; and
third and fourth electrical switches coupled in series with one another and collectively coupled in parallel across the second capacitor, the fourth electrical switch and the second capacitor coupled to a second of the split ground connections.

6. The apparatus of claim 1, further comprising:
a connector configured to receive control signals for the electrical switches from a different board.

7. The apparatus of claim 1, wherein a current commutation loop associated with the full bridge is located entirely within the IMS board.

8. A system comprising:
an insulated metal substrate (IMS) board comprising a base metal layer and a conductive layer separated by a dielectric layer, the IMS board carrying:
a first full bridge of a dual-full bridge power converter configured to convert between a higher electrical voltage and a lower electrical voltage, the first full bridge electrically coupled to the conductive layer, the first full bridge comprising multiple electrical switches configured to selectively form and break electrical connections with a transformer of the dual-full bridge power converter; and
at least one output capacitor coupled to the full bridge and configured to store electrical energy; and
a main board carrying a second full bridge of the dual-full bridge power converter, the transformer coupling the first and second full bridges;
wherein the base metal layer is configured as a grounding plane for the first full bridge; and
wherein the first full bridge has split ground connections to the grounding plane.

9. The system of claim 8, wherein:
the IMS board also carries:
a third full bridge of a second dual-full bridge power converter, the third full bridge electrically coupled to the conductive layer, the third full bridge comprising multiple second electrical switches configured to selectively form and break electrical connections with a second transformer of the second dual-full bridge power converter; and
at least one second output capacitor coupled to the third full bridge and configured to store electrical energy;
the main board also carries a fourth full bridge of the second dual-full bridge power converter; and
the second transformer couples the third and fourth full bridges of the second dual-full bridge power converter.

10. The system of claim 9, wherein:
the electrical switches of the first and third full bridges are arranged in pairs positioned side-by-side on the IMS board; and
each of the output capacitors comprises multiple capacitors positioned side-by-side on the IMS board.

11. The system of claim 8, wherein the IMS board further carries:
a current sensor configured to measure an output current of the first full bridge; and
a temperature sensor configured to measure a temperature proximate to at least one of the first electrical switches.

12. The system of claim 8, wherein:
the at least one output capacitor comprises a first capacitor and a second capacitor; and
the electrical switches comprise:
first and second electrical switches coupled in series with one another and collectively coupled in parallel across the first capacitor, the second electrical switch and the first capacitor coupled to a first of the split ground connections, and
third and fourth electrical switches coupled in series with one another and collectively coupled in parallel across the second capacitor, the fourth electrical switch and the second capacitor coupled to a second of the split ground connections.

13. The system of claim 8, wherein the IMS board further comprises a connector configured to receive control signals for the electrical switches from the main board.

14. The system of claim 8, wherein a current commutation loop associated with the first full bridge is located entirely within the IMS board.

15. The system of claim 8, wherein:
a first portion of the dual-full bridge power converter carried by the IMS board represents a lower-voltage portion of the dual-full bridge power converter; and
a second portion of the dual-full bridge power converter carried by the main board represents a higher-voltage portion of the dual-full bridge power converter.

16. The system of claim 8, further comprising:
a housing configured to receive the IMS board and the main board;
a cover configured to be sealed to the housing;
thermal pads configured to transport thermal energy from the transformer, IMS board, and main board into the housing; and
at least one fittings configured to allow a fluid coolant to flow through the housing and remove the thermal energy from the housing.

17. An electric vehicle comprising:
one or more batteries configured to provide a higher direct current (DC) electrical voltage;
a DC bus configured to provide a lower DC electrical voltage; and
a power supply module comprising:
an insulated metal substrate (IMS) board comprising a base metal layer and a conductive layer separated by a dielectric layer, the IMS board carrying:
a first full bridge of a dual-full bridge power converter configured to convert between the higher DC electrical voltage and the lower DC electrical voltage, the first full bridge electrically coupled to the conductive layer, the first full bridge comprising multiple electrical switches configured to selectively form and break electrical connections with a transformer of the dual-full bridge power converter, and
at least one output capacitor coupled to the full bridge and configured to store electrical energy; and
a main board carrying a second full bridge of the dual-full bridge power converter, the transformer coupling the first and second full bridges;
wherein the base metal layer is configured as a grounding plane for the first full bridge; and
wherein the first full bridge has split ground connections to the grounding plane.

18. The electric vehicle of claim 17, wherein:
the IMS board also carries:
a third full bridge of a second dual-full bridge power converter, the third full bridge electrically coupled to the conductive layer, the third full bridge comprising multiple second electrical switches configured to selectively form and break electrical connections with a second transformer of the second dual-full bridge power converter; and
at least one second output capacitor coupled to the third full bridge and configured to store electrical energy;
the main board also carries a fourth full bridge of the second dual-full bridge power converter;
the second transformer couples the third and fourth full bridges of the second dual-full bridge power converter; and
the second dual-full bridge power converter is configured to provide a second lower DC electrical voltage to a second DC bus.

19. The electric vehicle of claim 18, further comprising:
at least one first lower-voltage battery and at least one first load coupled to the DC bus;
at least one second lower-voltage battery and at least one second load coupled to the second DC bus; and
at least one common load coupled to both DC buses.

20. A method comprising:
controlling a first full bridge carried by an insulated metal substrate (IMS) board and a second full bridge carried by a main board of a dual-full bridge power converter to convert between a higher electrical voltage and a lower electrical voltage;
wherein the IMS board comprises a base metal layer and a conductive layer separated by a dielectric layer;
wherein the first full bridge is electrically coupled to the conductive layer, the first full bridge comprising multiple electrical switches configured to selectively form and break electrical connections with a transformer of the dual-full bridge power converter;
wherein at least one output capacitor is carried by the IMS board, the at least one output capacitor coupled to the full bridge and configured to store electrical energy;
wherein the base metal layer is configured as a grounding plane for the first full bridge; and
wherein the first full bridge has split ground connections to the grounding plane.

\* \* \* \* \*